United States Patent
Holma (10) Patent No.: US 7,415,060 B1
(45) Date of Patent: Aug. 19, 2008

(54) SPREAD SPECTRUM COMMUNICATION SYSTEM

(75) Inventor: Harri Holma, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/089,145

(22) PCT Filed: Sep. 29, 1999

(86) PCT No.: PCT/IB99/01668

§ 371 (c)(1), (2), (4) Date: Jul. 10, 2002

(87) PCT Pub. No.: WO01/24396

PCT Pub. Date: Apr. 5, 2001

(51) Int. Cl.
*H04B 1/707* (2006.01)

(52) U.S. Cl. ...................................... 375/141

(58) Field of Classification Search ........... 375/130, 375/140, 141, 147, 149
See application file for complete search history.

(56) References Cited

U.S. PATENT DOCUMENTS

| | | | | |
|---|---|---|---|---|
| 5,544,156 A | * | 8/1996 | Teder et al. | 370/342 |
| 6,108,369 A | * | 8/2000 | Ovesjo et al. | 375/146 |
| 6,222,875 B1 | * | 4/2001 | Dahlman et al. | 375/130 |
| 6,292,519 B1 | * | 9/2001 | Popovic | 375/346 |

FOREIGN PATENT DOCUMENTS

| | | |
|---|---|---|
| GB | 2 300 545 A | 11/1996 |
| GB | 2 301 999 A | 12/1996 |
| WO | 96/36132 | 11/1996 |

* cited by examiner

*Primary Examiner*—Kevin M Burd
(74) *Attorney, Agent, or Firm*—Banner & Witcoff, Ltd.

(57) ABSTRACT

Techniques and systems for estimating the spreading factor of data in a channel in a spread spectrum radio communication system is described. An illustrative method includes communication between a base station and a mobile station that takes place over a multirate data channel having a corresponding control channel. The control channel is transmitted in parallel with the data channel and is decoded to extract control information in order to decode the data channel. An illustrative method and system for estimating the spreading factor of data in a channel in a spread spectrum radio communication system includes a transmitter and a receiver, wherein the transmitter transmits a data unit at one of a plurality of spreading factors over a data channel and transmits in parallel over a control channel a control unit including information for decoding the data unit.

29 Claims, 6 Drawing Sheets

SPREAD SPECTRUM COMMUNICATION SYSTEM

BACKGROUND OF THE INVENTION

1. Field of the Invention

The present invention relates generally to a spread spectrum communication system, and more specifically, to spreading factor estimation in a spread spectrum communication system.

2. Description of the Prior Art

In a spread spectrum system, a modulation technique is used which spreads the information signal over a wide frequency band within the communication channel. The frequency band is much wider than the minimum bandwidth required to carry the information signal. For example, if the information signal is a voice signal, it may have a bandwidth of only a few kilohertz but, during transmission, it's energy could be spread so as to be transmitted over a channel 5 MHz wide. This is accomplished by modulating the information signal with a wideband encoding signal. The information signal is then recovered by remapping the received spread spectrum into its original bandwidth.

Spread spectrum systems can be multiple access communication systems. One type is a code division multiple access (CDMA) system. In a CDMA system, users of the system can simultaneously use the same wideband physical communication channel (for example, the same 5 MHz part of the spectrum) with the signals between one group/pair of users being differentiated from that of another by a unique spreading code.

Figure 1:
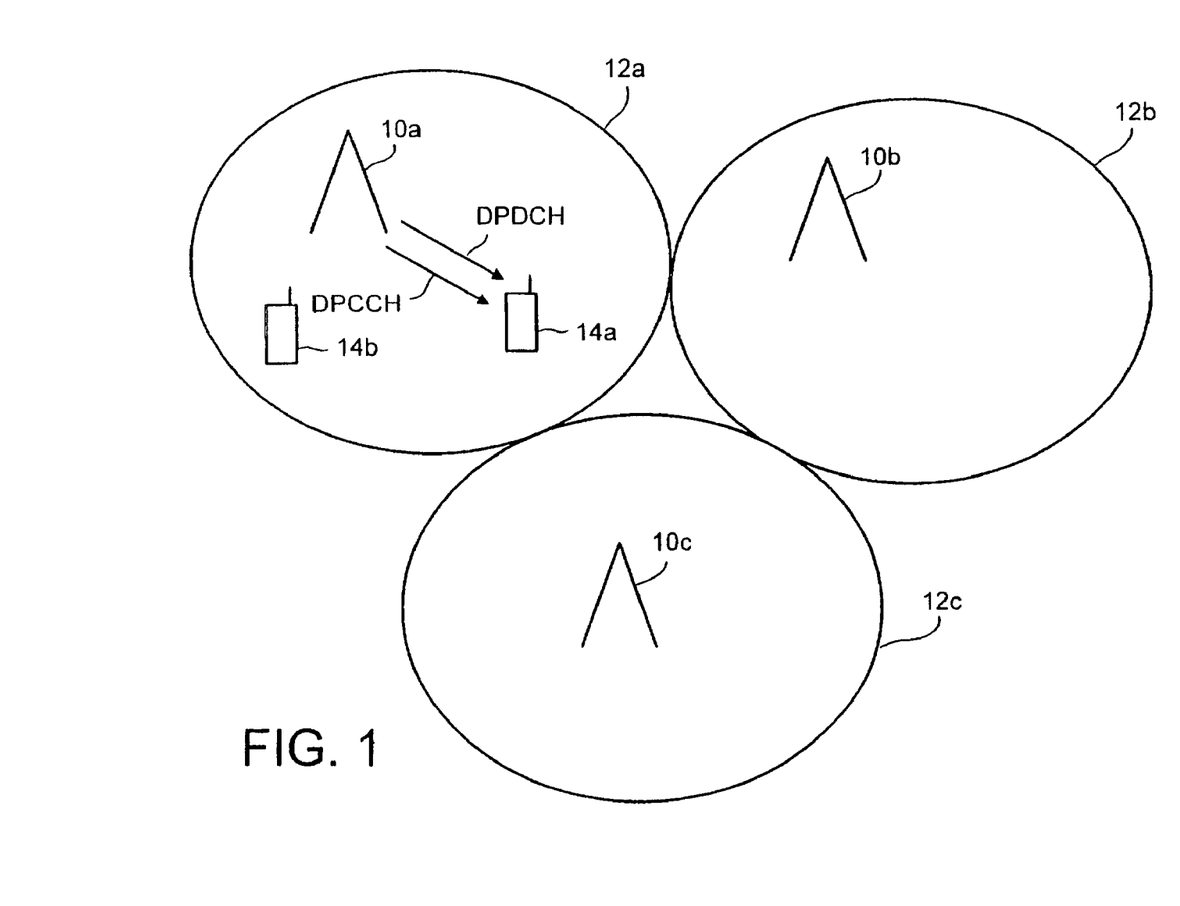
FIG. 1 shows a diagram of a cellular system useful for explaining the present invention.

The present invention is a particularly applicable to a cellular system. A highly schematic cellular architecture is shown in FIG. 1. The system comprises a plurality of macrocell base stations 10 (only an exemplary 10a, 10b, 10c being shown) providing service within a corresponding macrocell 12 (only an exemplary 12a, 12b, 12c being shown). The system also comprises a plurality of mobile stations 14 (only an exemplary 14a and 14b are shown in the macrocell 10a). Each base station 10 communicates with the mobile stations 14 on a CDMA channels at a frequency F1 and a bandwidth of 5 MHz, the communication channel(s) carried out between a base station 10 and a mobile station 14 in the service area thereof being defined by at least one unique spreading code.

SUMMARY OF THE INVENTION

The present invention is concerned with communications between a base station and a mobile station taking place over a multirate data channel having a corresponding control channel which is (i) transmitted in parallel with the data channel and which (ii) needs to be adequately decoded to extract control information in order to properly decode the data channel. This situation is illustrated in FIG. 1 in the downlink direction between the base station 10a and the mobile station 14a. The data channel is labelled DPDCH and the control channel is labelled DPCCH is labelled.

The present invention provides a method of estimating the spreading factor of data in a channel in a spread spectrum radio communication system comprising a transmitter and a receiver, wherein the transmitter transmits a data unit at one of a plurality of spreading factors over a data channel and transmits in parallel over a control channel a control unit comprising information for decoding said data unit.

The method includes steps of
decoding an initial portion of the control unit,
decoding an initial portion of the data unit at an assumed one of the plurality of spreading factors, and
calculating the received power of the initial portions of the control unit and the data unit to make an estimate of the spreading factor used to transmit the data unit. This situation is illustrated in FIG. 1 in the downlink direction between the base station 10a and the mobile station 14a. The data channel is labeled DPDCH and the control channel is labeled DPCCH.

By estimating the correct spreading factor used to transmit the data unit based on decoding only on an initial portion of the control unit and the data unit, the data unit can thereafter be properly decoded. Provision for the buffering of a whole data unit need not be made. It is also an advantage that, for the control channel, the transmission power need not be so high nor coding so powerful, because the information for decoding the data unit is not the only indicator of the spreading factor used to transmit the data unit.

The data in the data unit and the control unit is preferably interleaved. The length of the data unit and the control unit corresponds to the interleaving interval. For example, when the data is interleaved over one system frame, the control unit and the data unit each occupy one system frame. Moreover, when data is interleaved over a number of frames, the control unit and the data unit occupy that number of frames. In this case, because the spreading factor is constant over an interleaving interval, when the second and subsequent frames of a data unit are transmitted their spreading factor is already known. In one embodiment, the initial portion of the data unit can comprise one system frame.

Preferably, the lowest of the possible spreading factors is used to decode the initial portion of the data unit. By using this spreading factor, even if the data was actually transmitted with a higher spreading factor, the integrity of the data remains in tact even if it is poorly noise filtered.

The present invention is also a spread spectrum radio communication system, comprising a transmitter which transmits a data unit at one of a plurality of spreading factors over a data channel and transmits in parallel over a control channel a control unit comprising information for decoding the data unit, and a receiver comprising a decoder for decoding an initial portion of the control unit, a decoder for decoding an initial portion of the data unit at an assumed one of the plurality of spreading factors; and means for calculating the received power of the initial portions of the control unit and the data unit to make an estimate of the spreading factor used to transmit the data unit.

The present invention can be applied to especially, but not exclusively, to W_CDMA uplink.

In the context of the present invention, the term 'estimating the spreading factor' is used. It will be appreciated by those skilled in the art that by determining the spread factor (essentially a layer 1) quantity, the bit rate of data coming from the layer is also, in effect, being determined, the bit rate being a straightforward and known function of the amount of repetition applied by the channel coding.

BRIEF DESCRIPTION OF THE DRAWINGS

Exemplary embodiments of the invention are hereinafter described with reference to the accompanying drawings, in which:

FIGS. 5(a-c) show the signal constellations for the receiver of FIG. 3 with the DPDCH channel transmitting at three different power levels/spreading factors.

DESCRIPTION OF THE PREFERRED EMBODIMENTS

Referring back to FIG. 1, in order for the base stations 10 to communicate with the mobile stations or radiotelephones 14, that is to set up, release and maintain connections therebetween, a number of functions need to be achieved over the air in both the uplink and the downlink. These functions are carried out by means of logical channels.

Generically, the basic functions to be carried out are (i) synchronization, where the mobile station locks onto the timing of a base station, enabling it to decode other channels; (ii) broadcast, where, for the purposes of initialization, the mobile station decodes system and cell specific information e.g. cell identities, spreading codes, access channel and neighboring cells lists; (iii) random access, where the mobile station can initiate a service request; (iv) paging, whereby an incoming service can be directed to the mobile station; (v) dedicated channel control, necessary for carrying signalling information such as handover measurements, service adaptation information, and power control information; (vi) traffic, necessary for carrying a wide variety of user-service data. Thus, generally logical channels exist corresponding to each of the functions (i) to (vi).

These basic functions can be mapped into physical channels, wherein the precise choice of how the logical channel are mapped into the physical channels will be highly system dependant.

In the system of the illustrated embodiment, the downlink comprises three common channels: a primary and a secondary common control physical channel (CCPCH), and a synchronisation channel (SCH) (function (i) above). The downlink also includes dedicated physical data channels (DPDCH) (function (vi) above) and physical control channel (DPCCH) (function (v) above). The primary CCPCH incorporates the point to multipoint broadcast control channel (BCCH) (function (ii) above). The secondary CCPCH comprises a forward access channel (FACH) and a paging channel (PCH) (function (iv) above). The FACH is used for carrying control information to a mobile station when the network knows the location cell of the mobile station.

The uplink comprises one common channel, the random access channel (function (iii) above). The uplink also includes dedicated physical data channels (DPDCH) (function (vi) above) and physical control channel (DPCCH) (function (v) above).

When a mobile station, say 14a, is first powered up it initializes and registers with the network using the SCH to acquire synchronization to the strongest base station, which in this case is 14a. Once synchronization has occurred the mobile station 14a detects the CCPCH, reading the system and cell specific BCCH information. From the BCCH, the mobile station 14a acquires codes permitting it to make a call request with the network. After initialization, the mobile station enters idle mode and waits to be paged by an incoming service, for example, by an incoming call, or for the user to request a service, for example place an outgoing call.

Services for the user are provided using the previously mentioned DPDCH and the DPCCH. Each of these physical channel consists of 10 ms frames, each frame comprising 15 slots. In one mode, services are provided with the frames operating in a mode hereinafter referred to as the multirate mode. In this mode, the PDCH carries the user-service data at a data rate which is constant within a single frame, but may vary from frame to frame. The DPCCH carries control information necessary to decode the DPDCH. Specifically, each frame of the DPCCH includes a transport format indication TFI which carries information indicating the data rate of the corresponding frame of the DPDCH. The DPCCH also carries power control symbols, pilot symbols and service parameter information for the corresponding frame of the DPDCH. The DPCCH is transmitted at constant data rate.

Figure 2:
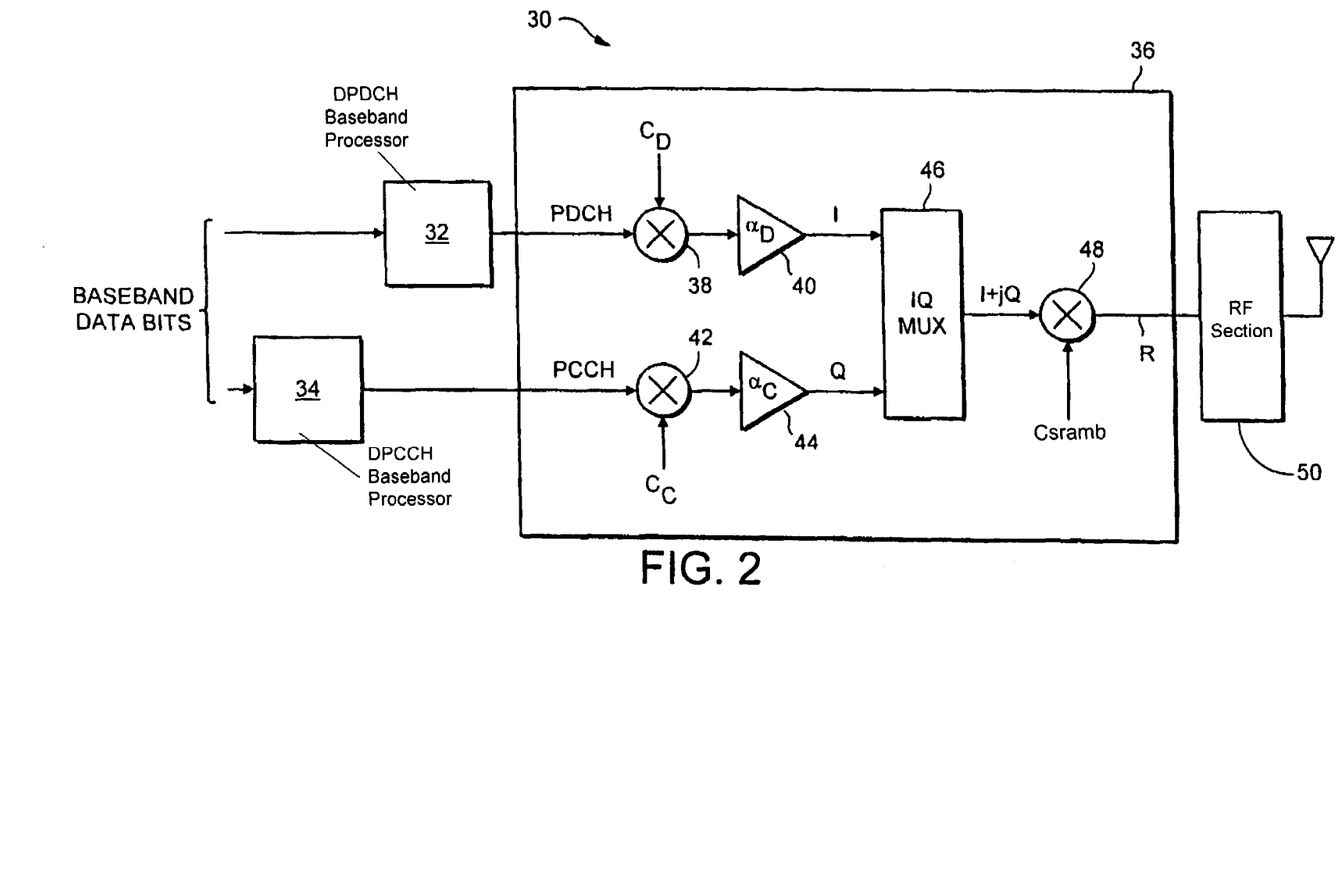
FIG. 2 shows a diagram of a mobile station transmitter architecture.

FIG. 2 shows the transmitter 30 architecture of a mobile station for transmitting data on these two physical channels. The base station comprises a DPDCH baseband processor 32 for baseband processing data for transmission on the DPDCH, and a DPCCH baseband processor 34 for baseband processing data for transmission on the DPCCH. Each baseband processor 32, 34 is operable to provide the conventional baseband processing operations, including, for example, convolution coding, turbo coding, puncturing/repetition and interleaving.

The data from each baseband processor 32, 34 is fed to a spreading modulation element 36. Within the spreading modulation element 36, the data for the DPCCH is spread by PN code Cd in a spreading element 38 and scaled by a factor Ad in scaling element 40 to give a signal I, and the data for DPDCH is spread by PN code Cc in spreading element 42 and scaled in scaling unit 44 by a factor Ac to give a signal Q. The codes Cd and Cc are orthogonal variable spreading factor codes. The signals I, Q are then fed to a quadrature modulator (QPSK) 46 to produce a signal I+jQ. This signal is then spread again by a PN scrambling code Cscramb in spreading element 48 which is a complex user-specific scrambling code to give signal R. The codes Cd and Cc are for channelization.

The multiplexed and spread signal R is then upconverted to the frequency F, power amplified and transmitted by RF section 50.

Figure 3:
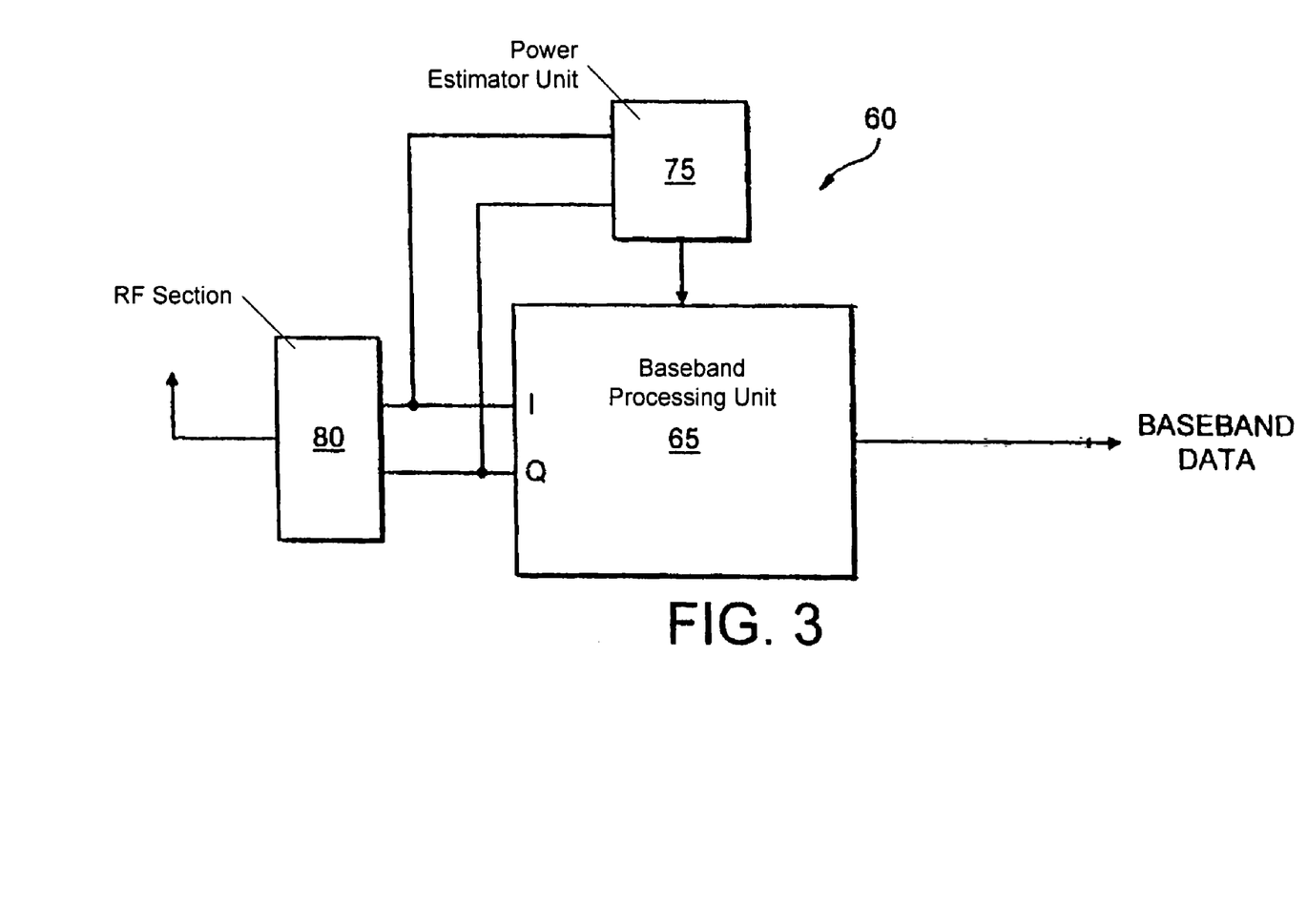
FIG. 3 shows a diagram of a base station receiver architecture.

FIG. 3 shows the receiver 60 architecture for the receiver of the base station. The receiver 60 comprises an RF section 80 for demodulating the received signals into the I,Q parts. A power estimator unit 75 provides an estimate of the power of I and Q and feeds this information to a baseband processing unit 65. As described below in more detail below, the baseband processing unit of the receiver 60 is able to use the power estimates I and Q to calculate an estimate of the spreading factor/data rate.

Figure 4:
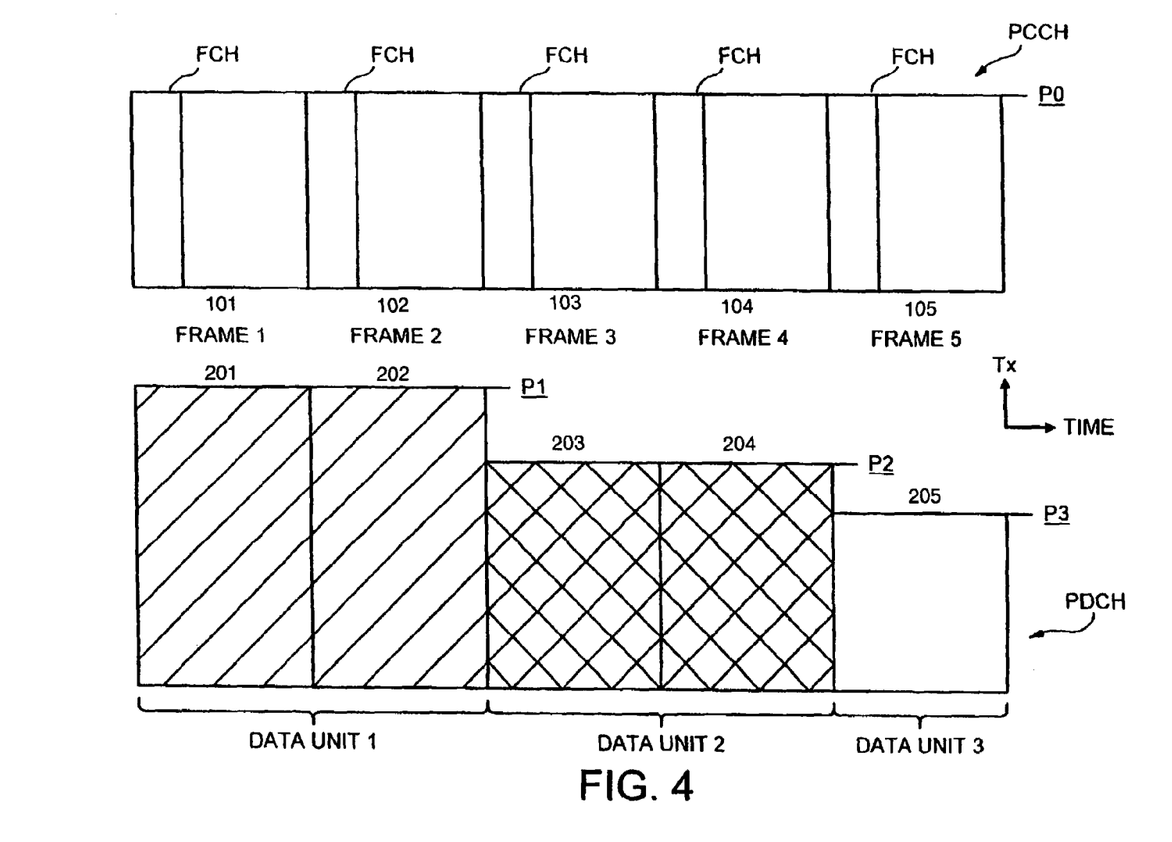
FIG. 4 shows the frame structure of the DPCCH and DPDCH from an air interface perspective.

The frame structure of the multirate mode is illustrated in FIG. 4. 5 exemplary 10 ms frames are shown, the DPCCH frames are labelled 101 to 105, and the corresponding DPDCH frames are labelled 201 to 205.

If FIG. 4 is considered as a simple example of a uplink transmission, from the air interface (layer 1) perspective, the user data stream is transmitted on DPDCH as three data units. Data unit 1 is transmitted over frames 1 and 2 at the highest power, P1 (and hence lowest spreading factor); data unit 2 is transmitted over frames 3 and 4 at a lesser power, P2; and data unit 3 is transmitted over frame 5 only at the lowest power, P3 (and hence highest spreading factor). The data rate of the blocks is changed by changing the length of the spreading codes or using parallel spreading codes in the spreading modulation unit 36 or by puncturing/repetition in the DPDCH baseband processor 32. Because of the interleaving operation in the baseband processor 32, the user service data is interleaved over both frames 1 and 2 in block 1, over both frames 3 and 4 in block 2, and over only frame 5 in block 3. Similarly, the data stream in the DPCCH, notably the FCH, is interleaved over frames 1 and 2, frames 3 and 4, and frame 5, corresponding to the data units in the DPCCH. As explained above though, the transmission power on this channel is constant, P0.

The receiver 60 knows a priori the set of possible ratios of data channel receive power to control channel receive power. Expressed in other words, it may be thought that the receiver 60 knows the set of absolute transmission powers/spreading factors, because the channel attenuation of the data channel and the control channel is approximately the same, the corresponding received powers are related to the corresponding transmission power by the same factor of proportionality. Hence, the set of possible ratios of data channel power to control channel power as transmitted are the same as the set possible of possible powers on reception.

Figure 5A:
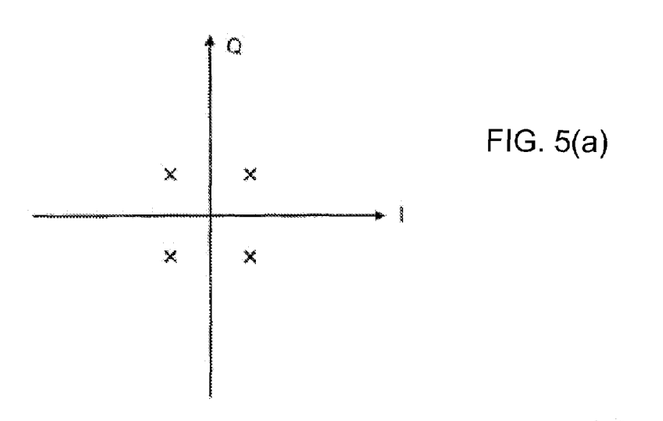
Figure 5B:
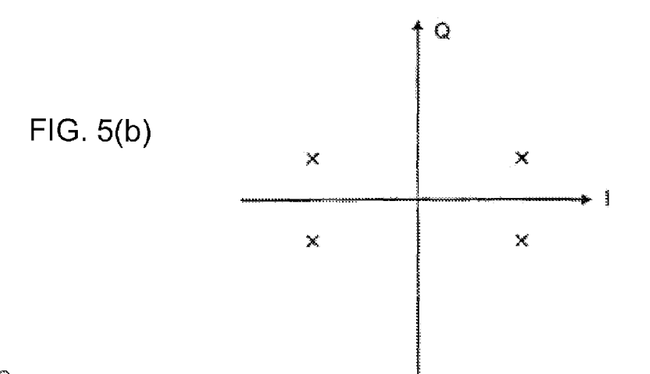
Figure 5C:
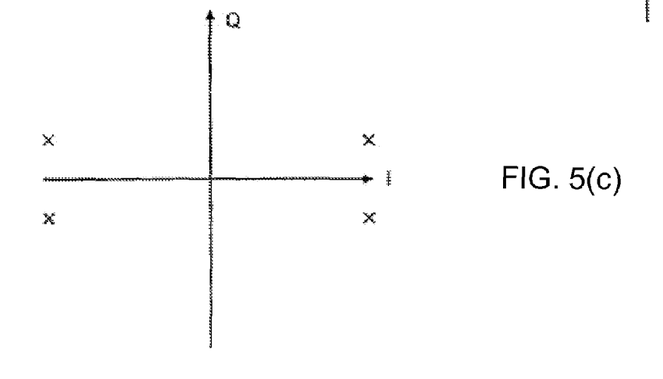

Thus, in this way, the transmission power and hence the spreading factor can be estimated in principle. FIGS. 5(a-c) show the signal constellations for received power is P3', P2' and P1', respectively. It will be appreciated that because the control and data channels are subjected to varying degrees of attenuation, the magnitude of the signal constellations vectors varies, but because the attenuation is approximately the same, their angles remain the same.

Referring again to FIG. 4, in order to estimate the relationship between the received power of the control channel and the data channel before the spreading factor used to transmit the data channel can be decoded from the control channel DPCCH, the data channel DPDCH signal is decoded assuming the lowest of the set of allowed spreading factors. With this assumption, the samples from the first 20% or so of frame 1 of the data channel DPDCH are decoded and averaged to give a power estimate Pda. Over the same interval, the control channel DPCCH is also decoded at its known, fixed spreading factor. The samples decoded from each channel are squared and averaged to give an estimate Pca. The ratio Pda/Pca will correspond more closely to one of P3'/P0', P2'/P0' or P1'/P0' and hence yield an estimate of the corresponding spreading factor. Once an estimate of the spreading factor is so obtained, decoding of the data channel begins at the estimated spreading factor and hence little buffering is needed. In this way, both frames 1 and 2 are decoded. The process is then repeated for data unit 2, and subsequently for data unit 3.

It will be appreciated that as the number of frames in a data unit increases the advantage of not having to buffer the whole data unit to properly to decode the TFI becomes more and more significant.

Figure 6:
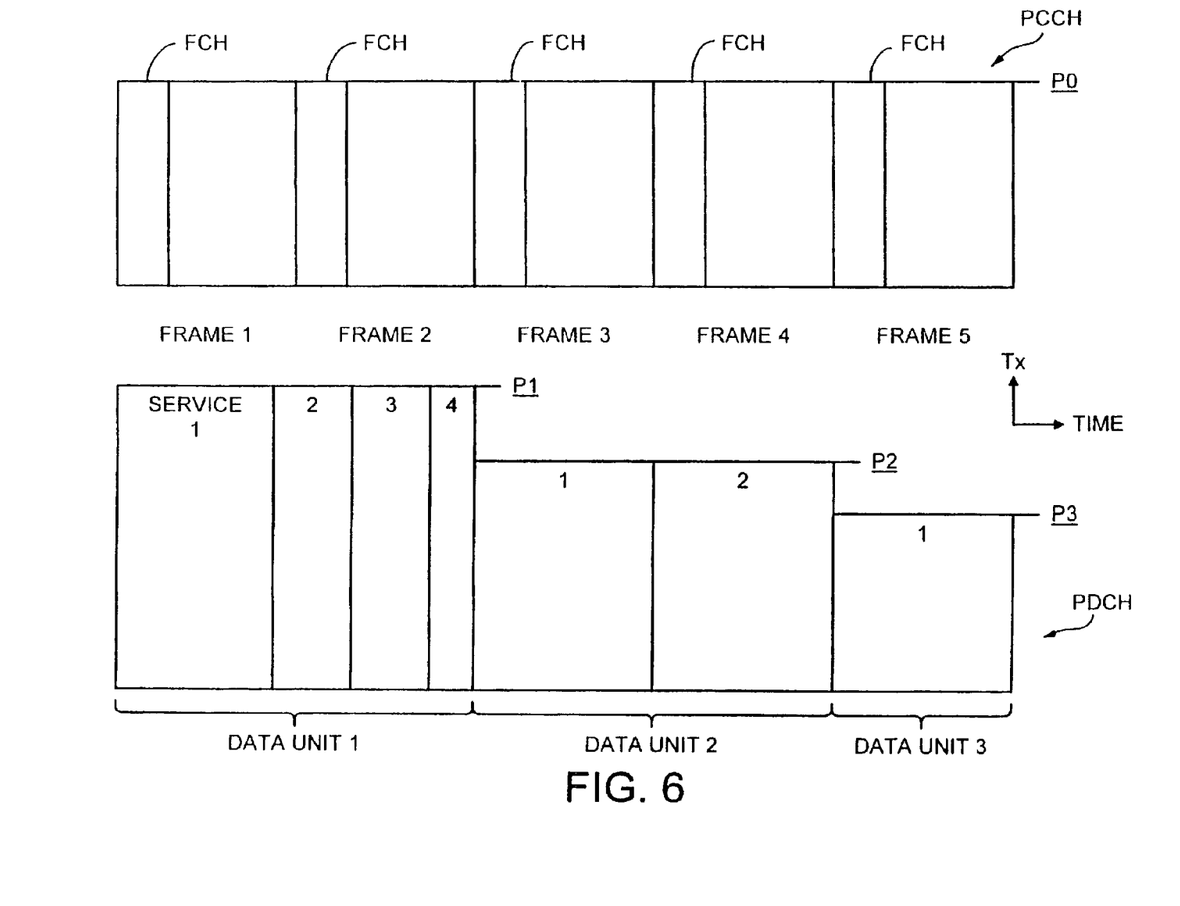
FIG. 6 shows the frames shown in FIG. 4 from a user service perspective.

Because communication between the base station 10a and the mobile station 14a takes place over a multirate data channel DPDCH having a corresponding control channel DPCCH which is transmitted in parallel and carries information about the data on the data channel, this channel architecture can be exploited advantageously in accordance with the described preferred embodiment of the invention to flexibly bundle a variety of user services into the data channel according to the priority of the services and the current data rate supportable by the data channel. For example, if there are four sets of user service data which need to be transmitted, say services 1 to 4 and, for convenience of explanation, the priority of the services is also in numerical order (whereby service 1 is the highest priority and service 4 is the lowest priority), then these services could be transmitted in accordance with the preferred embodiment of the invention as shown in FIG. 6. In FIG. 6, the same data units 1 to 3 of FIG. 4 are considered from a user services perspective. In data unit 1, transmitted with the power P1, where the spreading factor is the lowest and hence the data rate the highest, all services 1 to 4 are being transmitted. In data unit 2, which is at a lower power P2 and lower data rate, only higher priority services 1 and 2 are transmitted. In data unit 3, which is at the lowest power P2 and lowest data rate (highest spreading factor), only the highest priority service 1 is transmitted. Although for diagrammatic simplicity the services are shown in consecutive, separate time segments, in practice, each service is evenly interleaved over the respective data unit.

In other embodiments, the whole data unit can be decoded before estimation of the data rate/spreading factor because this may lead to better estimation.

The invention claimed is:

1. A method, comprising:
   decoding an initial portion of a control unit;
   decoding an initial portion of a data unit at an assumed one of a plurality of spreading factors;
   calculating a received power of the decoded initial portion of the control unit;
   calculating a received power of the decoded initial portion of the data unit;
   making an estimate of the spreading factor used to transmit the data unit, using the calculated received power of the decoded initial portion of the control unit and the calculated received power of the decoded initial portion of the data unit; and
   configuring a receiver based upon the estimate.

2. A method as in claim 1, wherein data in the control unit and the data unit is interleaved over the duration of respective units.

3. A method as in claim 2, wherein the data unit comprises a plurality of frames.

4. A method as in claim 3, wherein the assumed spreading factor is the lowest of the plurality of spreading factors.

5. A method as in claim 3, wherein the estimate is calculated by matching a relationship between the received powers of the control unit and the data unit with a member of a set of known possible power relationships, wherein each member of the set corresponds to one of the spreading factors.

6. A method as in claim 2, wherein the assumed spreading factor is the lowest of the plurality of spreading factors.

7. A method as in claim 2, wherein the estimate is calculated by matching a relationship between the received powers of the control unit and the data unit with a member of a set of known possible power relationships, wherein each member of the set corresponds to one of the spreading factors.

8. A method as in claim 2, wherein the data unit comprises a single frame.

9. A method as in claim 8, wherein the assumed spreading factor is the lowest of the plurality of spreading factors.

10. A method as in claim 8, wherein the estimate is calculated by matching a relationship between the received powers of the control unit and the data unit with a member of a set of known possible power relationships, wherein each member of the set corresponds to one of the spreading factors.

11. A method as in claim 1, wherein the assumed spreading factor is the lowest of the plurality of spreading factors.

12. A method as in claim 11, wherein the estimate is calculated by matching a relationship between the received powers of the control unit and the data unit with a member of a set of known possible power relationships, wherein each member of the set corresponds to one of the spreading factors.

13. A method as in claim 1, wherein the estimate is calculated by matching a relationship between the received powers of the control unit and the data unit with a member of a set of known possible power relationships, wherein each member of the set corresponds to one of the spreading factors.

14. A method as in claim 1, after having made the estimate, a remainder of the data unit is decoded using the estimate of the spreading factor.

15. A method as in claim 1, wherein the data unit comprises data relating to a plurality of user services.

16. A method as in claim 1, wherein the estimate of the spreading factor used to transmit the data unit is different from the assumed spreading factor used to decode the initial portion of the data unit.

17. A method as in claim 1, wherein the control unit includes information for decoding the data unit, wherein the information includes information indicating a data rate of the data unit, and the initial portion of the data unit is decoded at the assumed spreading factor before the information indicating the data rate of the data unit is decoded.

18. A method as in claim 16, wherein the initial portion of the data unit is decoded at the assumed spreading factor, and, after the estimate of the spreading factor has been made, a remainder of the data unit is decoded at the estimated spreading factor.

19. A method as claimed in claim 1, further comprising: transmitting the data unit at one of the plurality of spreading factors over the data channel and transmitting in parallel over the control channel the control unit comprising information for decoding the data unit.

20. A method, comprising:
 decoding an initial portion of a control unit;
 decoding the whole of a data unit at an assumed one of a plurality of spreading factors;
 calculating a received power of the decoded initial portion of the control unit;
 calculating a received power of the decoded data unit;
 making an estimate of the spreading factor used to transmit the data unit, using the calculated received power of the decoded initial portion of the control unit and the calculated received power of the decoded whole data unit; and
 configuring a receiver based upon the estimate.

21. A method as claimed in claim 20, further comprising: transmitting the data unit at one of the plurality of spreading factors over the data channel and transmitting in parallel over the control channel the control unit comprising information for decoding the data unit.

22. An apparatus comprising:
 a first component configured to decode an initial portion of a control unit;
 a second component configured to decode an initial portion of a data unit at an assumed one of a plurality of spreading factors;
 a third component configured to calculate a received power of the decoded initial portion of the control unit and a received power of the decoded initial portion of the data unit; and
 a fourth component configured to estimate the spreading factor used to transmit the data unit using the calculated received power of the decoded initial portion of the control unit and the calculated received power of the decoded initial portion of the data unit.

23. An apparatus as claimed in claim 22, further comprising: a transmitter for transmitting the data unit at one of the plurality of spreading factors over the data channel and for transmitting, in parallel over the control channel, the control unit comprising information for decoding the data unit.

24. An apparatus as claimed in claim 22, further comprising a fifth component configured to configure a receiver based upon the estimate.

25. An apparatus comprising:
 a first component configured to decode an initial portion of a control unit;
 a second component configured to decode an initial portion of a data unit at an assumed one of a plurality of spreading factors;
 a third component configured to calculate the received power of the decoded initial portion of the control unit and the decoded initial portion of the data unit; and
 a fourth component configured to estimate the spreading factor of the transmitted data unit using the calculated received power of the decoded initial portion of the control unit and the calculated received power of the decoded initial portion of the data unit.

26. The apparatus as claimed in claim 25, wherein the spreading factor is estimate by matching a relationship between the received powers of the decoded initial portion of the control unit and the decoded initial portion of the data unit with a member of a set of known possible power relationships, wherein each member of the set corresponds to one of the plurality of spreading factors.

27. An apparatus as claimed in claim 25, further comprising a fifth component configured to configure a receiver based upon the estimate.

28. An apparatus, comprising:
 means for decoding an initial portion of a control unit;
 means for decoding an initial portion of a data unit at an assumed one of a plurality of spreading factors;
 means for calculating a received power of the decoded initial portion of the control unit and a received power of the decoded initial portion of the data unit; and
 means for estimating the spreading factor used to transmit the data unit using the calculated received power of the decoded initial portion of the control unit and the calculated received power of the decoded initial portion of the data unit.

29. The apparatus as claimed in claim 28, wherein the spreading factor is estimated by matching a relationship between the received powers of the decoded initial portion of the control unit and the decoded initial portion of the data unit with a member of a set of known possible power relationships, wherein each member of the set corresponds to one of the plurality of spreading factors.

* * * * *